US00RE49317E

(19) United States
(12) Reissued Patent
Paek et al.

(10) Patent Number: US RE49,317 E
(45) Date of Reissued Patent: Nov. 29, 2022

(54) TRANSFORMER AND METHOD OF MANUFACTURING THE SAME

(71) Applicant: Samsung Electro-Mechanics Co., Ltd., Suwon-si (KR)

(72) Inventors: Hyun Paek, Suwon-si (KR); Yoo Sam Na, Seoul (KR); Hyeon Seok Hwang, Seoul (KR); Gyu Suck Kim, Suwon-si (KR); Su Gyeong Kim, Seoul (KR); Shin Hwan Hwang, Suwon-si (KR); Moon Suk Jeong, Suwon-si (KR)

(73) Assignee: Samsung Electro-Mechanics Co., Ltd., Suwon-si (KR)

(21) Appl. No.: 16/713,483

(22) Filed: Dec. 13, 2019

Related U.S. Patent Documents

Reissue of:
(64) Patent No.: 8,493,169
Issued: Jul. 23, 2013
Appl. No.: 13/682,262
Filed: Nov. 20, 2012

(30) Foreign Application Priority Data

Nov. 22, 2011 (KR) ..... 10-2011-0122338

(51) Int. Cl.
*H01F 5/00* (2006.01)
*H01F 27/28* (2006.01)
*H01F 19/04* (2006.01)

(52) U.S. Cl.
CPC ..... *H01F 5/003* (2013.01); *H01F 27/2804* (2013.01); *H01F 19/04* (2013.01); *H01F 2027/2809* (2013.01)

(58) Field of Classification Search
CPC ..... H01F 2017/0046; H01F 17/0013
USPC ..... 336/223, 183
See application file for complete search history.

(56) References Cited

U.S. PATENT DOCUMENTS 5,061,910 A * 10/1991 Bouny ..... H03F 3/211 333/26
7,088,214 B2 * 8/2006 Castaneda ..... H01F 17/0006 257/E27.046
7,171,739 B2 * 2/2007 Yang ..... H01F 17/0013 29/602.1
7,456,721 B2 * 11/2008 Chiu ..... H03H 7/42 336/200
7,482,904 B2 * 1/2009 Lee et al. ..... 336/200
(Continued)

FOREIGN PATENT DOCUMENTS

JP 2007-311753 A 11/2007

*Primary Examiner* — Anjan K Deb
(74) *Attorney, Agent, or Firm* — NSIP Law

(57) ABSTRACT

Disclosed herein are a transformer and a method of manufacturing the same. The transformer includes: a primary side winding having a loop shape; a secondary side winding formed on the same plane as that of the primary side winding in a remaining section except for at least a section at which it intersects with the primary side winding and having the same loop shape as that of the primary side winding so as to be electromagnetically coupled to the primary side winding; and an intersecting section formed so that the primary side and secondary side windings having the sum of the turn numbers of 3 or more intersect with each other in a two-layer structure, wherein the intersecting section includes at least one point of intermediate node having one side connected in a first layer and the other side connected in a second layer.

28 Claims, 5 Drawing Sheets

(56) References Cited

U.S. PATENT DOCUMENTS

| | | | | |
|---|---|---|---|---|
| 7,821,372 | B2 * | 10/2010 | Ho-Hsiang | H01F 17/0006 336/200 |
| 8,198,970 | B2 * | 6/2012 | Choi et al. | 336/200 |
| 2003/0231095 | A1 * | 12/2003 | Liang | H01L 27/08 336/223 |
| 2011/0018672 | A1 * | 1/2011 | Papananos | H01L 23/5227 336/200 |

* cited by examiner

- PRIOR ART -

TRANSFORMER AND METHOD OF MANUFACTURING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE(S) TO RELATED APPLICATIONS

This application *is a Reissue Application from U.S. Pat. No. 8,493,169 issued on Jul. 23, 2013 and filed Nov. 20, 2012, which* claims the benefit under 35 U.S.C. Section 119 of Korean Patent Application Serial No. 10-2011-0122338, entitled "Transformer and Method of Manufacturing the Same" filed on Nov. 22, 2011, which [is] *are* hereby incorporated by reference in [its entirety] *their entireties* into this application.

BACKGROUND OF THE INVENTION

1. Technical Field

The present invention relates to a transformer and a method of manufacturing the same, and more particularly, to a transformer in which three or more lines of a primary side and a secondary side intersect with each other in a two-layer structure, and a method of manufacturing the same.

2. Description of the Related Art

The present invention relates to a transformer used for matching and impedance conversion of a high frequency power amplifier used in a communication system. In a power amplifying module or a transceiving module, a power combiner necessarily used together with an amplifier device manufactured by a complementary metal oxide semiconductor (CMOS) process is generally an integrated passive device (IPD) type transformer. For example, in the case of a CMOS one-chip power amplifier, a method of combining parallel-amplified signals with each other is required. In this case, a transformer for combining power is required. The transformer for combining power serves to minimize loss while combining amplified powers with each other.

Describing a structure of a transformer according to the related art, it may be understood that an intersecting section shown in FIG. 2A is replaced with an intersecting section of FIG. 1. Here, an input side primary winding and an output side secondary winding are designed to be electromagnetically coupled to each other in a form in which they are opened. In the case in which the twisted turn number of output side or input side conductive lines is 2 or more, three or more connection line layers are generally used as shown in FIG. 2A.

In the case of a general semiconductor process, a thick metal layer through which a passive device may be designed is mainly configured of two layers. Therefore, in the case of using three or more layers as in the related art, a thickness of the metal layer becomes thin, such that efficiency of the transformer may be significantly deteriorated at the time of design of the transformer.

SUMMARY OF THE INVENTION

An object of the present invention is to provide a transformer capable of having improved efficiency by allowing a line intersecting structure including three or more lines of a primary side and a secondary side to become a two-layer structure.

According to an exemplary embodiment of the present invention, there is provided a transformer including: a primary side winding having a loop shape; a secondary side winding formed on the same plane as that of the primary side winding in a remaining section except for at least a section at which it intersects with the primary side winding and having the same loop shape as that of the primary side winding so as to be electromagnetically coupled to the primary side winding; and an intersecting section formed so that the primary side and secondary side windings having the sum of the turn numbers of 3 or more intersect with each other in a two-layer structure, wherein the intersecting section includes at least one point of intermediate node having one side connected in a first layer and the other side connected in a second layer.

At least one pair of outermost lines facing each other in a diagonal direction in the intersecting section among the three or more winding turns may be connected to each other in the first or second layer in the diagonal direction.

At least one sub-outermost line among the three or more winding turns may be connected to the intermediate node in the first or second layer in the intersecting section.

The sum of the turn numbers of the primary and secondary side windings may be an odd number, at least one pair of outermost lines facing each other in a diagonal direction in the intersecting section among the odd winding turns may be connected to each other in the first or second layer in the diagonal direction, and a pair of sub-outermost lines facing each other normally directly or obliquely in the intersecting section among the odd winding turns may be connected to each other through the intermediate node so as not to contact a connection line of the pair of outermost lines in the intersecting section, wherein one of the pair of sub-outermost lines is connected to the intermediate node in the first layer and the other thereof is connected to the intermediate node in the second layer.

The sum of the turn numbers of the primary and secondary side windings may be an odd number of 5 or more, and one of the pair of sub-outermost lines facing each other obliquely in the intersecting section among the odd winding turns is connected to the intermediate node in the first layer and the other thereof may be connected to the intermediate node in the second layer, wherein remaining lines among the odd winding turns are obliquely connected to each other in the other layer unlike that of the connection line of the pair of outermost lines so as to intersect with the connection line on a floor plane in the intersecting section.

The sum of the turn numbers of the primary and secondary side windings may be an even number, the intermediate nodes may be two points and face each other based on the center of the intersecting section, at least one pair of outermost lines facing each other in a diagonal direction in the intersecting section among the even winding turns may be connected to each other in the first or second layer in the diagonal direction, and at least one pair of sub-outermost lines facing each other normally directly or obliquely in the intersecting section among the even winding turns may be connected to each other through the intermediate node so as not to contact a connection line of the pair of outermost lines in the intersecting section, wherein one of the pair of sub-outermost lines is connected to the intermediate node in the first layer and the other thereof is connected to the intermediate node in the second layer.

The sum of the turn numbers of the primary and secondary side windings may be an even number of 6 or more, one of the pair of sub-outermost lines facing each other obliquely in the intersecting section among the even winding turns may be connected to one intermediate node in the first layer and the other thereof may be connected to one intermediate node in the second layer, and one of another pair of lines facing each other normally directly or obliquely in the intersecting section among the even winding turns may be connected to the other intermediate node in the first layer and the other thereof may be connected to the other intermediate node in the second layer, wherein remaining lines among the even winding turns are obliquely connected to each other in the other layer unlike that of the connection line of the pair of outermost lines so as to intersect with the connection line on a floor plane in the intersecting section.

Any one of the primary and secondary side windings may be a balanced signal line and the other thereof may be an unbalanced signal line.

According to another exemplary embodiment of the present invention, there is provided a method of manufacturing a transformer including a primary side winding having a loop shape and a secondary side winding formed on the same plane as that of the primary side winding and having the same loop shape as that of the primary side winding so as to be electromagnetically coupled to the primary side winding, the method including: forming an intersecting section so that the primary side and secondary side windings having the sum of the turn numbers of 3 or more intersect with each other in a two-layer structure, wherein the intersecting section includes at least one point of intermediate node having one side connected in a first layer and the other side connected in a second layer.

At least one pair of outermost lines facing each other in a diagonal direction in the intersecting section among the three or more winding turns may be connected to each other in the first or second layer in the diagonal direction.

At least one sub-outermost line among the three or more winding turns may be connected to the intermediate node in the first or second layer in the intersecting section.

The sum of the turn numbers of the primary and secondary side windings may be an odd number, at least one pair of outermost lines facing each other in a diagonal direction in the intersecting section among the odd winding turns may be connected to each other in the first or second layer in the diagonal direction, and a pair of sub-outermost lines facing each other normally directly or obliquely in the intersecting section among the odd winding turns may be connected to each other through the intermediate node so as not to contact a connection line of the pair of outermost lines in the intersecting section, wherein one of the pair of sub-outermost lines is connected to the intermediate node in the first layer and the other thereof is connected to the intermediate node in the second layer.

The sum of the turn numbers of the primary and secondary side windings may be an even number, the intermediate nodes may be two points and face each other based on the center of the intersecting section, at least one pair of outermost lines facing each other in a diagonal direction in the intersecting section among the even winding turns may be connected to each other in the first or second layer in the diagonal direction, and at least one pair of sub-outermost lines facing each other normally directly or obliquely in the intersecting section among the even winding turns may be connected to each other through the intermediate node so as not to contact a connection line of the pair of outermost lines in the intersecting section, wherein one of the pair of sub-outermost lines is connected to the intermediate node in the first layer and the other thereof is connected to the intermediate node in the second layer.

DESCRIPTION OF THE PREFERRED EMBODIMENTS

Figure 1:
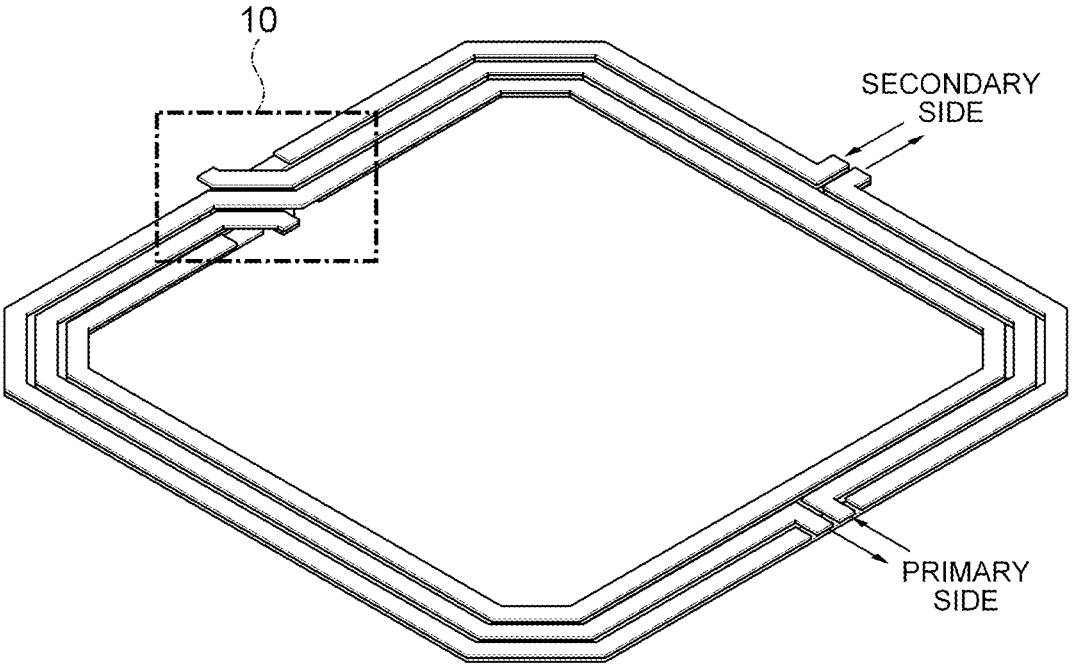
FIG. 1 is a view schematically showing a transformer according to an exemplary embodiment of the present invention.

Exemplary embodiments of the present invention for accomplishing the above-mentioned objects will be described with reference to the accompanying drawings. In describing exemplary embodiments of the present invention, the same reference numerals will be used to describe the same components and an additional description that is overlapped or allow the meaning of the present invention to be restrictively interpreted will be omitted.

In the specification, it will be understood that unless a term such as 'directly' is not used in a connection, coupling, or disposition relationship between one component and another component, one component may be 'directly connected to', 'directly coupled to' or 'directly disposed to' another element or be connected to, coupled to, or disposed to another element, having the other element intervening therebetween. In addition, this may also be applied to terms including the meaning of contact such as 'on', 'above', 'below', 'under', or the like. In the case in which a standard element is upset or is changed in a direction, terms related to a direction may be interpreted to including a relative direction concept.

Although a singular form is used in the present description, it may include a plural form as long as it is opposite to the concept of the present invention and is not contradictory in view of interpretation or is used as clearly different meaning. It should be understood that "include", "have", "comprise", "be configured to include", and the like, used in the present description do not exclude presence or addition of one or more other characteristic, component, or a combination thereof.

The accompanying drawings referred in the present description may be ideal or abstract examples for describing exemplary embodiments of the present invention. In the accompanying drawings, a shape, a size, a thickness, and the like, may be exaggerated in order to effectively describe technical characteristics.

First, a transformer according to a first exemplary embodiment of the present invention will be described in detail with reference to the accompanying drawings.

Figure 2A:
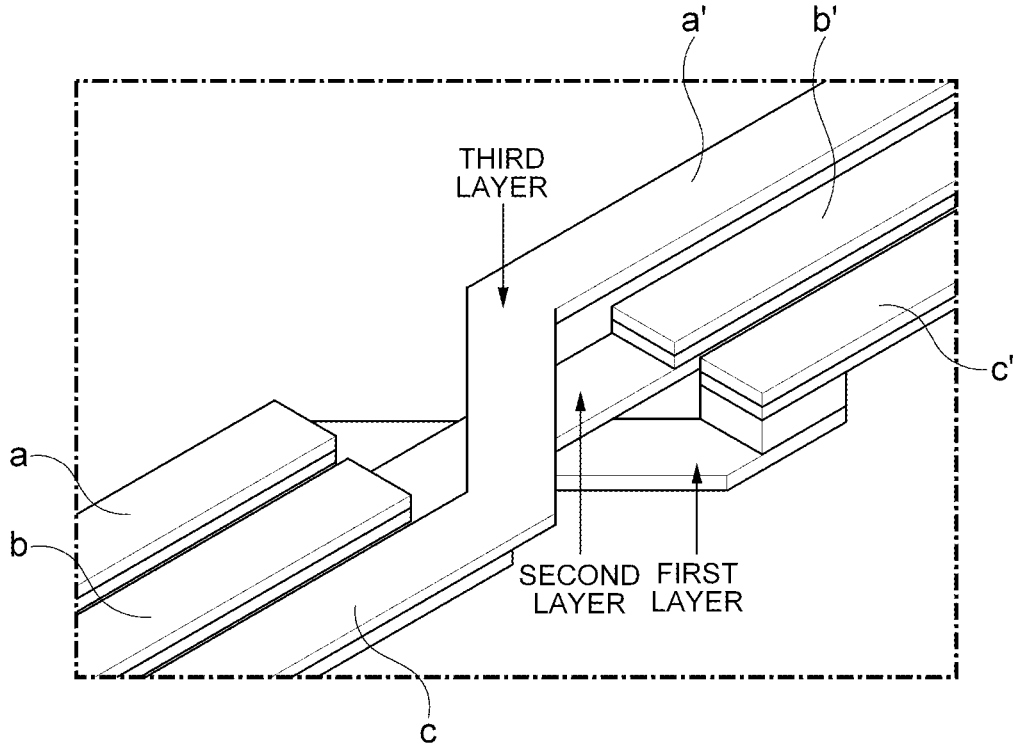
FIGS. 2A and 2B are, respectively, a view schematically showing an intersecting section of a transformer according to the related art and a view schematically showing an intersecting section of the transformer of FIG. 1.
Figure 2B:
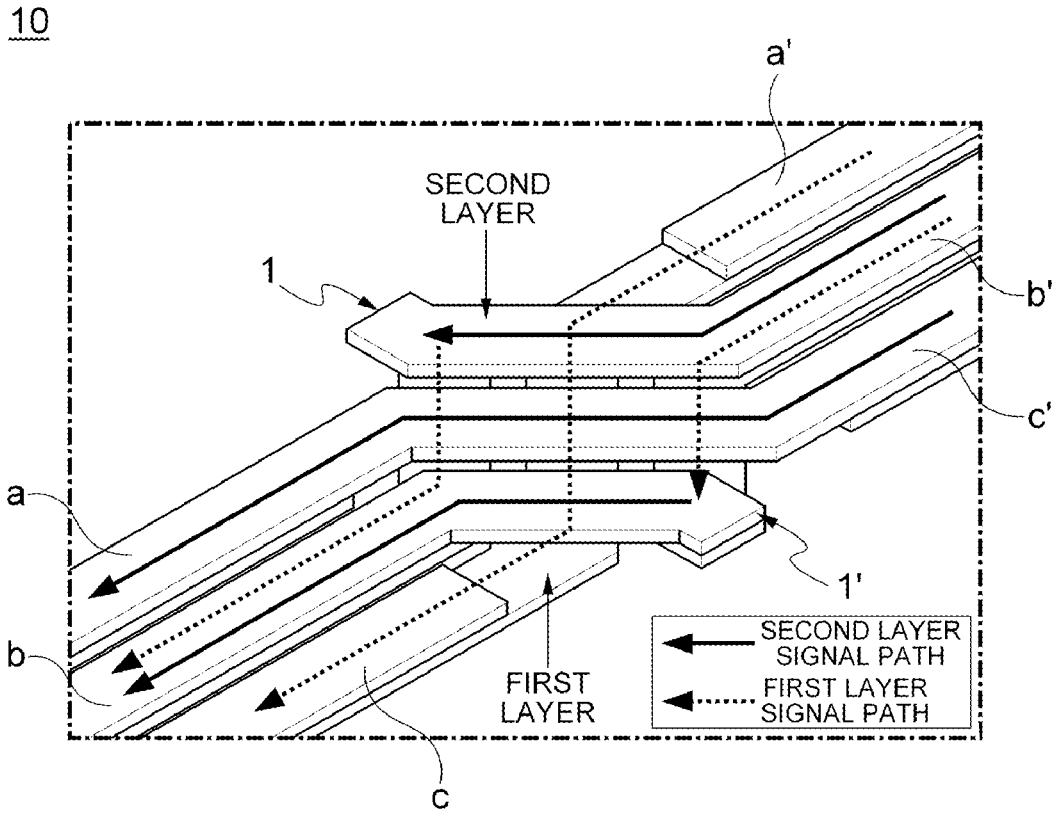
Figure 3:
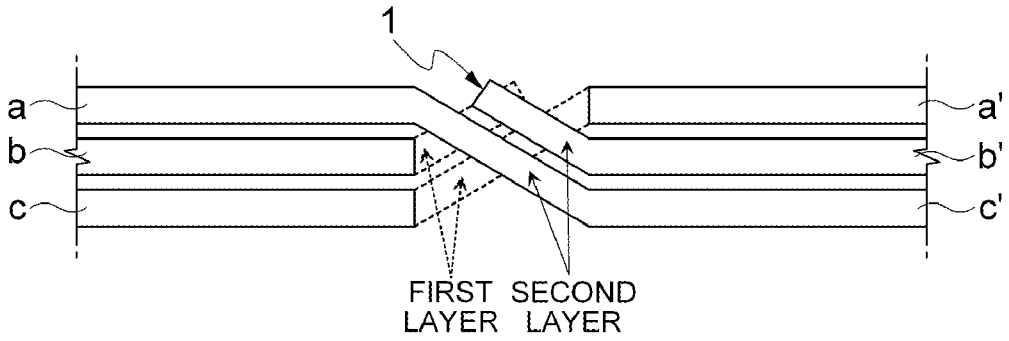
FIG. 3 is a view schematically showing an intersecting section of a transformer according to another exemplary embodiment of the present invention.
Figure 4:
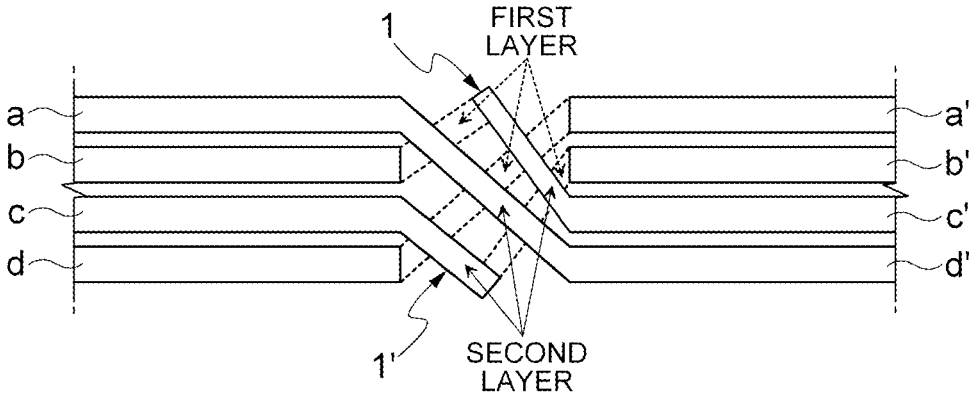
FIG. 4 is a view schematically showing an intersecting section of a transformer according to still another exemplary embodiment of the present invention.
Figure 5:
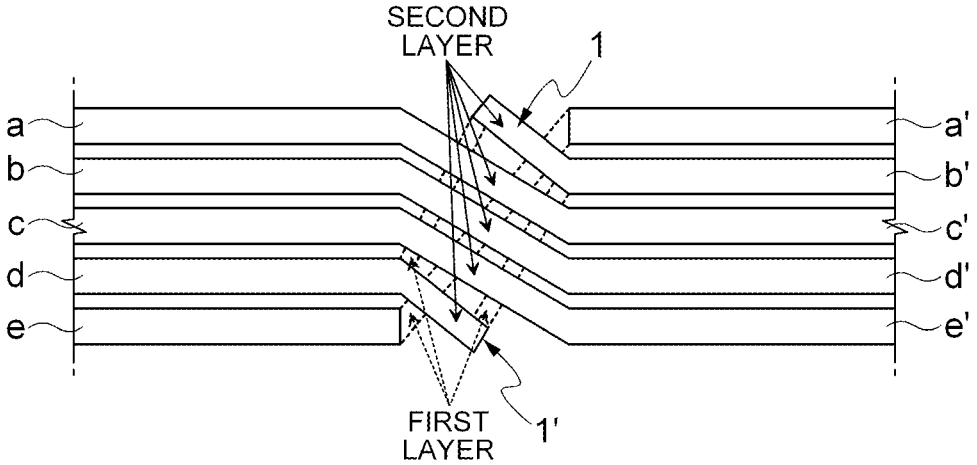
FIG. 5 is a view schematically showing an intersecting section of a transformer according to still another exemplary embodiment of the present invention.
Figure 6:
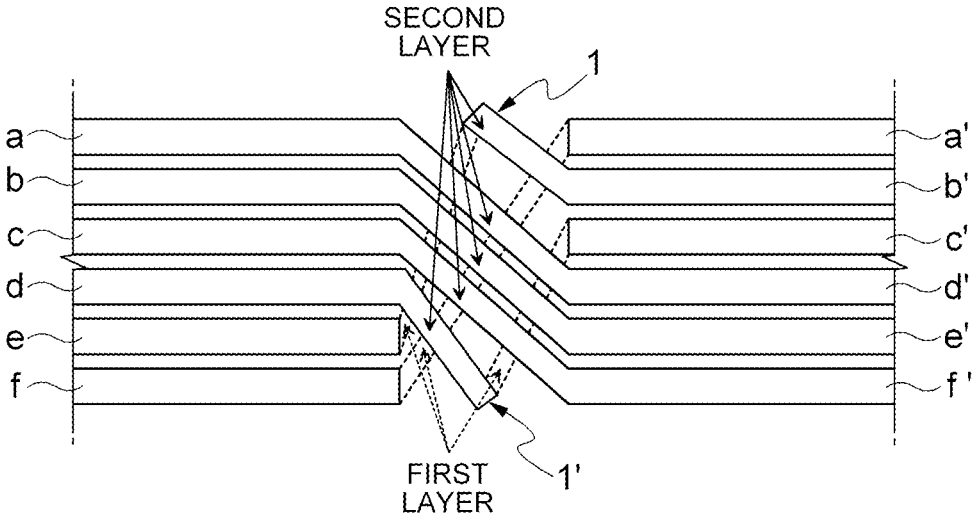
FIG. 6 is a view schematically showing an intersecting section of a transformer according to still another exemplary embodiment of the present invention.

FIG. 1 is a view schematically showing a transformer according to an exemplary embodiment of the present invention; FIGS. 2A and 2B are, respectively, a view schematically showing an intersecting section of a transformer according to the related art and a view schematically showing an intersecting section of the transformer of FIG. 1; FIG. 3 is a view schematically showing an intersecting section of a transformer according to another exemplary embodiment of the present invention; FIG. 4 is a view schematically showing an intersecting section of a transformer according to still another exemplary embodiment of the present invention; FIG. 5 is a view schematically showing an intersecting section of a transformer according to still another exemplary embodiment of the present invention; and FIG. 6 is a view schematically showing an intersecting section of a transformer according to still another exemplary embodiment of the present invention.

The transformer according to the first exemplary embodiment of the present invention will be described with reference to FIGS. 1, 2B, and 3 to 6.

The transformer according to the present embodiment is configured to include a primary side winding and a secondary side winding, wherein the primary side winding has a loop shape, and the secondary side winding formed on the same plane as that of the primary side winding in a remaining section except for at least a section at which it intersects with the primary side winding and having the same loop shape as that of the primary side winding so as to be electromagnetically coupled to the primary side winding. The present invention relates to a transformer in the case in which the sum of the turn numbers of primary side and secondary side windings on the same plane is 3 or more.

Here, the transformer according to the present embodiment includes an intersecting section 10 at which the primary side winding and the secondary side winding intersect with each other. Referring to FIG. 1, the primary side and secondary side windings of which the sum of the turn number is 3 or more intersect with each other in a two-layer structure in the intersecting section 10. In FIG. 1, a reference numeral 10 indicates the intersecting section. Referring to FIGS. 2B and 3 to 6, it may be appreciated that three or more primary and secondary side winding lines intersect with each other in a two-layer structure.

Further, referring to FIGS. 2B and 3 to 6, in the present embodiment, the intersecting section 10 includes at least one point of intermediate node 1 having one side connected in a first layer and the other side connected in a second layer.

In the present embodiment, the intersecting section 10 includes at least one point of intermediate node 1, such that the intersecting section 10 may have a two-layer structure unlike the case according to the related art even though the primary side and the secondary side have three or more winding turns. Two points of intermediate nodes 1 and 1' are shown in FIGS. 2B and 4 to 6, and one point of intermediate node 1 is shown in FIG. 3. Although not shown, the intersecting section 10 may also have three points of intermediate nodes. For example, as a modified example of FIG. 5, lines b and b' may also be connected to each other through a first point 1 of intermediate node, lines d and d' may also be connected to each other through a second point 1' of intermediate node, and the lines d and d' may also be again connected to each other through a third point (not shown) of intermediate node formed at a region at which they do not contact connection lines of the first layer in the intersecting section 10. In this case, each of the lines b and b' and the line d and d' is not connected to each other, but may be connected to another terminal. As an example, in the case in which each of the primary and secondary sides has only a pair of terminals, the number of points of the intermediate nodes may be one or two, and in the case in which any one of the primary and secondary sides has two pairs of terminals, the number of points of the intermediate nodes may be added.

For example, the intermediate nodes 1 and 1' may be positioned at an edge portion of the intersecting section 10 rather than a central portion thereof. In this case, the intermediate nodes 1 and 1' may be positioned on extension lines of outermost lines of primary and secondary sides.

In addition, referring to FIG. 2B, a case in which each of signals is transmitted to first and second layers in lines b and b'. In this case, an insulation layer may be provided between the first and second layers in each line of the primary and secondary sides. Also in FIGS. 3 to 6, each of signals may be transmitted to first and second layers as in the lines b and b' of FIG. 2B. In this case, an insulation layer may be provided between the first and second layers. In addition, referring to FIG. 2B, in the case in which the respective lines connected to each other by a connection line in the first or second layer in the intersecting section 10 are multilayer transmission lines, they are conducted through a conductor before being connected to each other by the connection line, such that the signal may be transmitted through the connection line in each of the multilayer lines. For example, in FIG. 2B, a line a and a line c' are connected to each other only in the second layer. However, in the case in which the line a and the line c' are multilayer transmission lines, a signal in a transmission line of a lower first layer may be transmitted from the line a side to a connection line of a second layer via a conductor (not shown) and be then transmitted from the line c' side to an original transmission line of the first layer through a conductor (not shown) before the line a and the line c' are connected to each other by the connection line. This is also applied to the cases of FIGS. 3 to 6.

According to the present embodiment, a transformer generally connected to an output terminal of a power amplifier is improved to reduce power loss, thereby making it possible to improve an output of the power amplifier.

As an example, any one of winding lines of the primary side and the secondary side windings may be a balanced signal line and the other thereof may be an unbalanced signal line.

In addition, referring to FIGS. 2B and 3 to 6, as an example, at least one pair of outermost lines facing each other in a diagonal direction in the intersecting section 10 among three or more winding turns may be connected to each other in the first or second layer in the diagonal direction. Here, the outermost line means an outermost portion that is in a range of the intersecting section 10 rather than an outermost portion in the entire transformer structure as shown in FIG. 1. For example, in the entire transformer structure of FIG. 1, an outermost line and an innermost line correspond to the outermost line. Therefore, each of two pairs of outermost lines faces each other in the intersecting section 10. According to the present embodiment, at least one pair of outermost lines facing each other in the diagonal direction are connected to each other in the diagonal direction. In FIGS. 2B, 3, and 4, a case in which each of two pairs of outermost lines facing each other in the diagonal direction are connected to each other in the first and second layers in the diagonal direction is shown. Meanwhile, in FIGS. 5 and 6, a case in which a pair of outermost lines facing each other in the diagonal direction are connected to each other in the first layer in the diagonal direction is shown.

Referring to FIGS. 2B, 3 to 6 in detail, as another example, at least one sub-outermost line among three winding lines may be connected to the central node 1 in the first or second layer in the intersecting section. Here, the sub-outermost line means an inner side directly adjacent to the outermost line described above. In FIGS. 2B and 3, only a pair of sub-outermost lines is present in the intersecting section 10, and FIGS. 4 to 6, each of two pairs of sub-outermost lines faces each other in the intersecting section 10. In FIG. 2B, a case in which each of the pair of sub-outermost lines is connected to two points of intermediate nodes 1 and 1' in the first and second layers, and in FIG. 3, a case in which one of the pair of sub-outermost lines is connected to one point of intermediate node 1 in the first layer and the other thereof is connected to one point of intermediate node 1 in the second. In FIGS. 4 and 5, a case in which each of two pairs of sub-outermost lines is connected to two points of intermediate nodes 1 and 1', and in FIG. 6, a case in which a pair of sub-outermost lines is connected to one point of intermediate node 1. In FIG. 6, the other node 1' connects a pair of lines other than the outermost line and the sub-outermost line to each other.

Further referring to FIGS. 2B, 3, and 5, as an example, the sum of the turn numbers of the primary and secondary side windings is an odd number. In this case, at least one pair of outermost lines facing each other in the diagonal direction in the intersecting section 10 among the odd winding turns may be connected to each other in the first or second layer in the diagonal direction. In FIGS. 2B and 3, a pair of outermost lines are connected to each other in the diagonal direction, and in FIG. 5, each of two pairs of outermost lines are connected to each other in the diagonal direction. Further, in the case in which the sum of the turn numbers of the primary and secondary side windings is an odd number, the pair of sub-outermost lines facing each other normally directly or obliquely in the intersecting section 10 among the odd winding turns may be connected to each other through the intermediate node 1 so as not to contact a connection line of the pair of outermost lines in the intersecting section 10. In FIGS. 2B and 3, a pair of sub-outermost lines faces each other horizontally, and in FIG. 5, each of two pairs of sub-outermost lines faces each other obliquely and one of the two pairs of sub-outermost lines are connected to each other through two points of intermediate nodes 1 and 1'. In addition, one of the pair of sub-outermost lines may be connected to the intermediate node 1 in the first layer, and the other thereof may be connected to the intermediate node 1 in the second layer. Here, as an example, in the case in which the sum of the turn numbers of the primary and secondary side windings is an odd number, the pair of sub-outermost lines may be connected to each other at one point of intermediate node 1 or two points of intermediate nodes 1 and 1'. Although FIG. 5 shows that the pair of sub-outermost lines are connected to each other at two points of intermediate nodes 1 and 1', the pair of sub-outermost lines may also be connected to each other at one point of intermediate node 1 as shown in FIG. 3.

Further, in the case in which the sum of the turn numbers of the primary and secondary side windings is an odd number, for example, in the case in which the sum of the turn numbers of the primary and secondary side windings is 3, one of the primary and secondary side forms a single line, and the other thereof forms two lines to have the turn number of 2. In the case in which the sum of the turn numbers of the primary and secondary side windings is 5, one of the primary or secondary side may form two lines to have the turn number of 2, and the other thereof may form three lines to have the turn number of 3. In the case in which the sum of the turn numbers of the primary and secondary side windings is 5, any one side having the turn number of 2 may be disposed between lines having the turn number of 3. For example, referring to FIG. 5, a signal transmitted through a line d in any one side of the primary and secondary sides may be moved through lines b', b and d'. Alternatively, when signals are input through lines d and d' in an opposite direction to each other, they are exit from the other terminal or a ground (not shown) through lines b' and b. Here, remaining lines may form the other side of the primary and secondary sides, and a transmission signal in a line a may exit while being turned three times through lines c', c, e', e, and a'.

Referring to FIG. 5, as another example, the sum of the turn numbers of the primary and secondary side windings is an odd number of 5 or more. Here, one of the pair of sub-outermost lines facing each other obliquely in the intersecting section 10 among the odd winding turns may be connected to the intermediate node 1 in the first layer, and the other thereof may be connected to the intermediate node 1 in the second layer. In addition, the remaining lines of the odd winding lines may be obliquely connected to a connection line of the pair of outermost lines in the other layer so as to intersect with the connection line of the outermost lines on a floor plane in the intersecting section 10. In FIG. 5, lines e and a', which are the outermost lines, are connected to each other in the first layer, lines d and b', which are the sub-outermost lines, are obliquely connected to each other through two points of intermediate nodes 1, and lines a and c', lines b and d', and lines c and e', which are the remaining lines, are connected to each other in the second layer, which is a layer different from the first layer in which the lines e and a' corresponding to the outermost lines are connected to each other so as to intersect with a connection line of the line c and e' on the floor plane.

Further referring to FIGS. 4 and 6, as an example, the sum of the turn numbers of the primary and secondary side windings is an even number. Here, the intermediate nodes 1 and 1' may be two points. The two points of the intermediate nodes 1 and 1' may face each other based on the center of the intersecting section 10. In addition, at least one pair of outermost lines facing each other in the diagonal direction in the intersecting section 10 among the even winding turns may be connected to each other in the first or second layer in the diagonal direction. In FIG. 4, each of two pairs of outermost lines are connected to each other in the diagonal direction, and in FIG. 6, only a pair of outermost lines are connected to each other in the diagonal direction.

Further, at least one pair of sub-outermost lines facing each other normally directly or obliquely in the intersecting section 10 among the even winding turns may be connected to each other through the intermediate node 1 so as not to contact a connection line of the pair of outermost lines in the intersecting section 10. Here, one of the pair of sub-outermost lines may be connected to the intermediate node 1 in the first layer, and the other thereof may be connected to the intermediate node 1 in the second layer.

Further referring to FIG. 6, as an example, the sum of the turn numbers of the primary and secondary side windings is an even number of 6 or more. Here, one of the pair of sub-outermost lines facing each other obliquely in the intersecting section 10 among the even winding turns may be connected to one point of intermediate node 1 in the first layer, and the other thereof may be connected to one point of intermediate node 1 in the second layer. In addition, one of another pair of lines (lines d and c' of FIG. 6) facing each other obliquely in the intersecting section 10 among the even winding turns may be connected to the intermediate node 1' in the first layer, and the other thereof may be connected to the intermediate node 1' in the second layer. In addition, the remaining lines of the even winding lines may be obliquely connected to a connection line of the pair of outermost lines in the other layer so as to intersect with the connection line on the floor plane in the intersecting section 10.

Hereinafter, a method of manufacturing a transformer according to a second exemplary embodiment of the present invention will be described.

In describing the present embodiment, the transformer according to the first exemplary embodiment of the present invention described above and FIGS. 1, 2B, and 3 to 6 will be referred. In this case, a description overlapped with that of the first exemplary embodiment of the present invention will be omitted.

Referring to FIGS. 1, 2B, 3 to 6, a method of manufacturing a transformer according to the second exemplary embodiment of the present invention, the transformer including a primary side winding having a loop shape and a secondary side winding formed on the same plane as that of the primary side winding and having the same loop shape as that of the primary side winding so as to be electromagnetically coupled to the primary side winding, the method includes: forming an intersecting section 10 so that the primary side and secondary side windings having the sum of the turn numbers of 3 or more intersect with each other in a two-layer structure. Here, the secondary side winding is formed on the same plane as that of the primary side winding in a remaining section except for at least a section at which it intersects with the primary side winding.

Referring to FIGS. 2B and 3 to 6, in the present embodiment, the intersecting section 10 includes at least one point of intermediate node having one side connected in a first layer and the other side connected in a second layer. In the present embodiment, the intersecting section 10 includes at least one point of intermediate node 1, such that the intersecting section 10 may have a two-layer structure unlike the case according to the related art even though the primary side and the secondary side have three or more winding turns. Two points of intermediate nodes 1 and 1' are shown in FIGS. 2B and 4 to 6, and one point of intermediate node 1 is shown in FIG. 3.

As an example, any one of the primary and secondary side windings may be a balanced signal line and the other thereof may be an unbalanced signal line.

Further referring to FIGS. 2B and 3 to 6, as an example, at least one pair of outermost lines facing each other in a diagonal direction in the intersecting section 10 among three or more winding turns may be connected to each other in the first or second layer in the diagonal direction.

In addition, further referring to FIGS. 2B, 3 to 6, as another example, at least one sub-outermost line among three winding lines may be connected to the central node 1 in the first or second layer in the intersecting section 10.

Referring to FIGS. 2B, 3, and 5 in detail, as an example, the sum of the turn numbers of the primary and secondary side windings is an odd number. In this case, at least one pair of outermost lines facing each other in the diagonal direction in the intersecting section 10 among the odd winding turns may be connected to each other in the first or second layer in the diagonal direction. Further, the pair of sub-outermost lines facing each other normally directly or obliquely in the intersecting section 10 among the odd winding turns may be connected to each other through the intermediate node 1 so as not to contact a connection line of the pair of outermost lines in the intersecting section 10. In addition, one of the pair of sub-outermost lines may be connected to the intermediate node 1 in the first layer, and the other thereof may be connected to the intermediate node 1 in the second layer.

Further referring to FIGS. 4 and 6, as an example, the sum of the turn numbers of the primary and secondary side windings is an even number. Here, the intermediate nodes 1 and 1' may be two points. Here, the two points of the intermediate nodes 1 and 1' may face each other based on the center of the intersecting section 10. In addition, at least one pair of outermost lines facing each other in the diagonal direction in the intersecting section 10 among the even winding turns may be connected to each other in the first or second layer in the diagonal direction. Further, at least one pair of sub-outermost lines facing each other normally directly or obliquely in the intersecting section 10 among the even winding turns may be connected to each other through the intermediate node 1 so as not to contact a connection line of the pair of outermost lines in the intersecting section 10. In addition, one of the pair of sub-outermost lines may be connected to the intermediate node 1 in the first layer, and the other thereof may be connected to the intermediate node 1 in the second layer.

As set forth above, according to the exemplary embodiments of the present invention, the line intersecting structure of the transformer including three or more lines of the primary and secondary sides becomes a two-layer structure, making it possible to improve efficiency of the transformer.

According to the exemplary embodiment of the present invention, a transformer generally connected to an output terminal of a power amplifier is improved to reduce power loss, thereby making it possible to improve an output of the power amplifier.

It is obvious that various effects directly stated according to various exemplary embodiment of the present invention may be derived by those skilled in the art from various configurations according to the exemplary embodiments of the present invention.

The accompanying drawings and the above-mentioned exemplary embodiments have been illustratively provided in order to assist in understanding of those skilled in the art to which the present invention pertains rather than limiting a scope of the present invention. In addition, exemplary embodiments according to a combination of the above-mentioned configurations may be obviously implemented by those skilled in the art. Therefore, various exemplary embodiments of the present invention may be implemented in modified forms without departing from an essential feature of the present invention. In addition, a scope of the present invention should be interpreted according to claims and includes various modifications, alterations, and equivalences made by those skilled in the art.

What is claimed is:

1. A transformer comprising:

a primary side winding having a loop shape;

a secondary side winding [formed on the same plane as that of the primary side winding in a remaining section except for at least a section at which it intersects with the primary side winding and] having the same loop shape as that of the primary side winding so as to be electromagnetically coupled to the primary side winding; and an intersecting section formed so that the primary side and secondary side windings having the sum of the turn numbers of 3 or more intersect with each other in a two-layer structure, wherein the intersecting section includes at least one point of intermediate node having one side connected in a first layer and the other side connected in a second layer,

*wherein the secondary side winding intersects with the primary side winding,*

*wherein the secondary side winding is formed on the same plane as that of the primary side winding in a remaining section except for at least a section of the intersecting section at which it intersects with the primary side winding.*

2. The transformer according to claim 1, wherein at least one pair of outermost lines facing each other in a diagonal direction in the intersecting section among the three or more winding turns are connected to each other in the first or second layer in the diagonal direction.

3. The transformer according to claim 1, wherein at least one sub-outermost line among the three or more winding turns is connected to the intermediate node in the first or second layer in the intersecting section.

4. The transformer according to claim 1, wherein the sum of the turn numbers of the primary and secondary side windings is an odd number, at least one pair of outermost lines facing each other in a diagonal direction in the intersecting section among the odd winding turns are connected to each other in the first or second layer in the diagonal direction, and a pair of sub-outermost lines facing each other normally directly or obliquely in the intersecting section among the odd winding turns are connected to each other through the intermediate node so as not to contact a connection line of the pair of outermost lines in the intersecting section, one of the pair of sub-outermost lines being connected to the intermediate node in the first layer and the other thereof being connected to the intermediate node in the second layer.

5. The transformer according to claim 4, wherein the sum of the turn numbers of the primary and secondary side windings is an odd number of 5 or more, and one of the pair of sub-outermost lines facing each other obliquely in the intersecting section among the odd winding turns is connected to the intermediate node in the first layer and the other thereof is connected to the intermediate node in the second layer, remaining lines among the odd winding turns being obliquely connected to each other in the other layer unlike that of the connection line of the pair of outermost lines so as to intersect with the connection line on a floor plane in the intersecting section.

6. The transformer according to claim 1, wherein the sum of the turn numbers of the primary and secondary side windings is an even number, the intermediate nodes are two points and face each other based on the center of the intersecting section, at least one pair of outermost lines facing each other in a diagonal direction in the intersecting section among the even winding turns are connected to each other in the first or second layer in the diagonal direction, and at least one pair of sub-outermost lines facing each other normally directly or obliquely in the intersecting section among the even winding turns are connected to each other through the intermediate node so as not to contact a connection line of the pair of outermost lines in the intersecting section, one of the pair of sub-outermost lines being connected to the intermediate node in the first layer and the other thereof being connected to the intermediate node in the second layer.

7. The transformer according to claim 6, wherein the sum of the turn numbers of the primary and secondary side windings is an even number of 6 or more, one of the pair of sub-outermost lines facing each other obliquely in the intersecting section among the even winding turns is connected to one intermediate node in the first layer and the other thereof is connected to one intermediate node in the second layer, and one of another pair of lines facing each other normally directly or obliquely in the intersecting section among the even winding turns is connected to the other intermediate node in the first layer and the other thereof is connected to the other intermediate node in the second layer, remaining lines among the even winding turns being obliquely connected to each other in the other layer unlike that of the connection line of the pair of outermost lines so as to intersect with the connection line on a floor plane in the intersecting section.

8. The transformer according to claim 1, wherein any one of the primary and secondary side windings is a balanced signal line and the other thereof is an unbalanced signal line.

9. The transformer according to claim 2, wherein any one of the primary and secondary side windings is a balanced signal line and the other thereof is an unbalanced signal line.

10. The transformer according to claim 3, wherein any one of the primary and secondary side windings is a balanced signal line and the other thereof is an unbalanced signal line.

11. The transformer according to claim 4, wherein any one of the primary and secondary side windings is a balanced signal line and the other thereof is an unbalanced signal line.

12. The transformer according to claim 5, wherein any one of the primary and secondary side windings is a balanced signal line and the other thereof is an unbalanced signal line.

13. The transformer according to claim 6, wherein any one of the primary and secondary side windings is a balanced signal line and the other thereof is an unbalanced signal line.

14. The transformer according to claim 7, wherein any one of the primary and secondary side windings is a balanced signal line and the other thereof is an unbalanced signal line.

15. A method of manufacturing a transformer including a primary side winding having a loop shape and a secondary side winding formed on the same plane as that of the primary side winding and having the same loop shape as that of the primary side winding so as to be electromagnetically coupled to the primary side winding, the method comprising:

forming an intersecting section so that the primary side and secondary side windings having the sum of the turn numbers of 3 or more intersect with each other in a two-layer structure, wherein the intersecting section includes at least one point of intermediate node having one side connected in a first layer and the other side connected in a second layer.

16. The method according to claim 15, wherein at least one pair of outermost lines facing each other in a diagonal direction in the intersecting section among the three or more winding turns are connected to each other in the first or second layer in the diagonal direction.

17. The method according to claim 15, wherein at least one sub-outermost line among the three or more winding turns is connected to the intermediate node in the first or second layer in the intersecting section.

18. The method according to claim 15, wherein the sum of the turn numbers of the primary and secondary side windings is an odd number, at least one pair of outermost lines facing each other in a diagonal direction in the intersecting section among the odd winding turns are connected to each other in the first or second layer in the diagonal direction, and a pair of sub-outermost lines facing each other normally directly or obliquely in the intersecting section among the odd winding turns are connected to each other through the intermediate node so as not to contact a connection line of the pair of outermost lines in the intersecting section, one of the pair of sub-outermost lines being connected to the intermediate node in the first layer and the other thereof being connected to the intermediate node in the second layer.

19. The method according to claim 15, wherein the sum of the turn numbers of the primary and secondary side windings is an even number, the intermediate nodes are two points and face each other based on the center of the intersecting section, at least one pair of outermost lines facing each other in a diagonal direction in the intersecting section among the even winding turns are connected to each other in the first or second layer in the diagonal direction, and at least one pair of sub-outermost lines facing each other normally directly or obliquely in the intersecting section among the even winding turns are connected to each other through the intermediate node so as not to contact a connection line of the pair of outermost lines in the intersecting section, one of the pair of sub-outermost lines being connected to the intermediate node in the first layer and the other thereof being connected to the intermediate node in the second layer.

*20. The transformer according to claim 1, wherein the intersecting section comprises a first winding of the primary and secondary side windings on the first layer of the two-layer structure crossing a second winding of the primary and secondary side windings on the second layer of the two-layer structure and the one side of the at least one point of intermediate node connects to a third winding of the primary and secondary side windings in the first layer crossing the second winding and the other side of the at least one point of intermediate node connects to the third winding in the second layer crossing the first winding.*

*21. The transformer according to claim 20, wherein the third winding is disposed between the first winding and the second winding on the same plane in the remaining section.*

*22. The transformer according to claim 21, wherein the at least one point of intermediate node is disposed innermost to the first and second windings in the intersecting section.*

*23. The method according to claim 15, wherein the intersecting section comprises a first winding of the primary and secondary side windings on the first layer of the two-layer structure crossing a second winding of the primary and secondary side windings on the second layer of the two-layer structure and the one side of the at least one point of intermediate node connects to a third winding of the primary and secondary side windings in the first layer to crossing the second winding and the other side of the at least one point of intermediate node connects to the third winding in the second layer to cross the first winding.*

*24. The method according to claim 23, wherein the third winding is disposed between the first winding and the second winding on the same plane in the remaining section.*

*25. The method according to claim 24, wherein the at least one point of intermediate node is disposed innermost to the first and second windings in the intersecting section.*

*26. A transformer comprising:*

*a primary side winding having a loop shape;*

*a secondary side winding having the same loop shape as that of the primary side winding so that the primary and the secondary side windings electromagnetically couple,*

*wherein the secondary side winding intersects with the primary side winding,*

*wherein the secondary side winding is formed on the same plane as that of the primary side winding in a remaining section except for at least a section of the intersecting section at which it intersects with the primary side winding,*

*wherein the intersecting section includes plural windings, of the primary and secondary side windings, intersecting each other with respect to different layers of a corresponding two-layer structure,*

*wherein the intersecting section includes at least one point of intermediate node having respective sides connected in the different layers, and*

*wherein the plural windings of the primary and secondary side windings in the intersecting section include a total of 3 or more turns, so as to include at least a first, a second, and a third winding.*

*27. The transformer according to claim 26, wherein the transformer includes plural primary side windings alternatingly formed with plural secondary side windings except in corresponding intersecting sections.*

*28. The transformer according to claim 26,*

*wherein respective sides of the at least one point of intermediate node are connected to the third winding in a first layer to cross the second winding and in the second layer to cross the first winding, and*

*wherein the third winding is disposed between the first winding and the second winding on the same plane in the remaining section.*

* * * * *